(12) United States Patent
Chen et al.

(10) Patent No.: US 7,981,453 B2
(45) Date of Patent: Jul. 19, 2011

(54) DELIVERY SYSTEM FOR LOW CALORIE BULKING AGENTS

(75) Inventors: Wen-Sherng Chen, Glenview, IL (US); John Westcott Finley, Baton Rouge, LA (US); Bruce Campbell, Glenview, IL (US); Ariel Cudia, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 642 days.

(21) Appl. No.: 11/025,462

(22) Filed: Dec. 29, 2004

(65) Prior Publication Data

US 2006/0141101 A1      Jun. 29, 2006

(51) Int. Cl.
 *A23L 1/00* (2006.01)
(52) U.S. Cl. .......... 426/99; 426/289; 426/293; 426/302; 426/303
(58) Field of Classification Search ................ 426/99, 426/289, 293, 302, 303
See application file for complete search history.

(56) References Cited

U.S. PATENT DOCUMENTS

| | | | |
|---|---|---|---|
| 4,698,232 A | 10/1987 | Sheu et al. | |
| 4,915,971 A | 4/1990 | Fennema et al. | |
| 5,437,885 A | 8/1995 | Lusas et al. | |
| 5,534,501 A | 7/1996 | Samain et al. | |
| 5,545,414 A | 8/1996 | Behr et al. | |
| 5,681,601 A * | 10/1997 | Hendrick et al. | 426/99 |
| 5,976,598 A * | 11/1999 | Akkaway et al. | 426/496 |
| 7,252,850 B2 * | 8/2007 | Levin et al. | 426/615 |
| 2003/0059458 A1 | 3/2003 | Haber et al. | |

FOREIGN PATENT DOCUMENTS

| | | |
|---|---|---|
| JP | 56-169560 A | 12/1981 |
| JP | 02-299556 A | 12/1990 |
| JP | 4-364123 A | 12/1992 |
| JP | 04364123 | 12/1992 |
| JP | 05-186336 A | 7/1993 |
| JP | 2001-086956 A | 4/2001 |
| JP | 2004-532644 A | 10/2004 |
| WO | WO 86/00501 | 1/1986 |
| WO | WO 87/03453 | 6/1987 |
| WO | WO 92/18239 | 10/1992 |
| WO | WO 96/28983 | 9/1996 |
| WO | WO 00/74501 | 12/2000 |
| WO | 02/102167 A1 | 12/2002 |
| WO | 03/090557 A1 | 11/2003 |
| WO | 2004/016288 A1 | 2/2004 |

OTHER PUBLICATIONS

Translation of Jp 05-186336.*

* cited by examiner

Primary Examiner — Lien Tran
(74) Attorney, Agent, or Firm — Fitch, Even, Tabin & Flannery

(57) ABSTRACT

The present invention generally relates to low calorie bulking agents (e.g., cellulose, starch, bran, glucans, hydrocolloids, and the like) coated with a lipid compound to form a base or inner layer and thereafter encapsulating the fiber/lipid complex within a protein compound as an outer layer. In effect, the present invention provides a delivery system for edible fibers wherein the moisture absorption by the edible fibers can be controlled. Using the encapsulated fiber of this invention, the absorption of water by the edible fiber (and thus the swelling of the edible fiber) can be effectively delayed until the encapsulated fiber reaches the stomach and normal digestive processes begin.

11 Claims, 2 Drawing Sheets

DELIVERY SYSTEM FOR LOW CALORIE BULKING AGENTS

FIELD OF THE INVENTION

The present invention relates to improved low calorie bulking agents or fibers (e.g., cellulose, starch, bran, glucans, hydrocolloids, and the like). More specifically, the present invention relates to encapsulation of low calorie bulking agents or fibers using an edible coating consisting of a first layer (i.e., base or inner layer) of a fat or lipid that at least partially surrounds the individual fibers and a second layer (i.e., outer layer) of protein which surrounds the first layer on the individual fibers.

BACKGROUND OF THE INVENTION

Low calorie bulking agents, such as cellulose, starch, glucans, cereal bran, and hydrocolloids (e.g., xanthan, guar, and alginate), generally are indigestible polymers that can be used in food products. These agents, often referred to as "fiber" or "roughage," pass through the digestive system for the most part intact, and have been shown to have a number of actual and potential health benefits. As used herein, "fiber" refers to indigestible organic material contained in food, and "hydrocolloid" refers to a material that forms a gel when in contact with water. Fiber and hydrocolloids are capable of absorbing many times their weight in water, causing them to expand greatly in size (often up to a factor of about 20 as compared to the original volume).

The beneficial aspects of fiber in the diet are well recognized. The addition of such indigestible materials to food stimulates the intestine to peristalsis, resulting in increased digestion of accompanying food materials. Due to its effect on digestion, increased consumption of dietary fiber has been linked to decreases in the incidence of gastrointestinal diseases, including bowel cancer.

Additionally, fiber has been suggested as a significant cholesterol-lowering dietary product. Dietary fiber appears to also lower the risk of coronary heart disease through a variety of mechanisms in addition to lowering blood cholesterol, such as attenuating blood triglyceride levels, decreasing hypertension, and normalizing postprandial blood glucose levels. See, e.g., Lupton et al., "Dietary Fiber and Coronary Disease: Does the Evidence Support an Association?," *Curr. Atheroscler. Rep.*, 5:500-5 (2003). The ability of fiber compounds to relieve hypertension and normalize glucose levels may prove more beneficial to some individuals than its cholesterol-lowering abilities.

Long-term intake of high-dietary fiber has also been shown to have a beneficial effect on glucose tolerance and lipid metabolism, suggesting that it could prove a valuable therapy for treating type 2 diabetes. Li et al., "Long-term Effects of High Dietary Fiber Intake on Glucose Tolerance and Lipid Metabolism in Gk Rats: Comparison among Barley, Rice, and Cornstarch," *Metabolism*, 52:1206-10 (2003).

One type of non-fiber compound that appears to lower cholesterol is plant protein (e.g., soy protein). Carroll, "Review of Clinical Studies on Cholesterol-Lowering Response to Soy Protein," *J. Am. Dietetic Assoc.* 91:820-827 (1991). Significant decreases in cholesterol levels (in the range of 15 to 20%) have been documented from diets containing primarily soy protein, as compared to control diets containing primarily casein. Meinertz et al., "Soy Protein and Casein in Cholesterol-enriched Diets: Effects on Plasma Lipoproteins in Normolipidemic Subjects," *Am. J. Clin. Nutr.*, 50:786-793 (1989); Sirtori et al., "Clinical Experience with the Soybean Protein Diet in the Treatment of Hypercholesterolemia," *Am. J. Clin. Nutr.*, 32:1645-1658 (1979); Sirtori et al., "Soybean-Protein Diet in the Treatment of Type II Hyperlipoproteinemia," *Lancet* 275-277(1977). Nevertheless, the cholesterol-lowering effect of soy protein has not been consistently observed in all subjects, and may be more pronounced in younger subjects and in hyperlipidemic subjects. Meinertz et al., *Am. J. Clin. Nutr.*, 50:786-793 (1989). A combination of dietary fiber and cholesterol-lowering proteins, however, may contribute to significant decreases in LDL cholesterol.

Unfortunately, current food products are unable to take full advantage of many of the above benefits of dietary fiber. It has been suggested that the processing of bran can decrease the cholesterol-lowering benefit ordinarily gained from bran. Kerckhoffs et al., "Cholesterol-Lowering Effect of Beta-glucan from Oat Bran in Mildly Hypercholesterolemic Subjects May Decrease When Beta-glucan Is Incorporated into Bread and Cookies," *Am. J. Clin. Nutr.*, 78:221-7 (2003).

Consumption of dietary fiber is generally low in the United States and other western countries because of its unsavory texture, mouthfeel, and flavor. This unpalatability of fiber is due, at least in part, by its tendency to absorb water and swell to many times its original size. This ability to absorb water also affects the process dynamics of any food composition containing the fiber. Therefore, it is difficult to add significant amounts of fiber and hydrocolloids to baked products such as cookies, crackers, pasta, dough, extruded snacks, and confections. Furthermore, this capacity to absorb water often makes mastication and digestion of fiber difficult. Absorption of water often also gives such compounds an undesirable texture and consistency. For example, adding uncoated hydrophilic fiber to cookie batter results in a cookie dough that does not spread upon baking, and results in baked products having a dry mouthfeel and an ultimate texture that resembles cake-type products rather than conventional cookie-type products.

Edible coatings for the prevention of water transfer in foods are known in the art. Carbohydrate, lipid, and protein compounds have been used alone and in combination in order to alter the water absorption of various food products, including low calorie bulking agents. Effective coating of fiber to prevent, or significantly reduce water absorption, is very difficult because of the hydrophobic nature and irregular shape of most fibers. Additionally, even slight gaps in the coating can allow rapid water absorption. Despite the fact that the hydrophobic nature of lipids, including fats, oils, and waxes, makes them especially suitable as water impermeable barriers, they have proven to be inadequate barrier layers for fibers because they do not form a continuous barrier surrounding the fibers. Lipid-coated food products generally have holes or gaps in the coating through which water is free to transfer. Carbohydrate coating, although providing continuous coatings, are generally insufficient at preventing water absorption due to their hydrophilic nature. Protein compounds have also proven to be inadequate barriers to water absorption for fibers because of their high zeta potential, which results in incomplete coating of the fibers. Thus, the use of lipid, protein, or a simple mixture thereof has generally been inadequate to fully encapsulate a fiber particle and substantially prevent the absorption of water by the fiber particle.

U.S. Pat. No. 4,915,971 provides an edible film for retarding water transfer among individual components of a multi-component food product. The film is composed of a hydrophilic polymer base layer adjacent to a hydrophobic lipid base layer with its hydrophobic surface presented away from the hydrophilic layer. The film is formed on a non-food supporting surface, and then removed and placed in-between two adjacent components of a food product, such that the hydrophobic lipid layer is oriented toward the food component with higher vapor pressure.

Encapsulation of dietary fiber in a more water-soluble fiber has been described. For example, U.S. Patent Publication 2003/0059458 provides a method for masking of the unappealing sensory properties (e.g., color, flavor, and texture) of carob fiber by encapsulation with a water-soluble dietary fiber.

International Patent Publication WO 00/74501 discloses a particulate fiber composition containing at least one dietary fiber surrounded by an insoluble or low-solubility fiber that will deliver the dietary fiber to a predetermined portion of the digestive tract without dissolution.

U.S. Pat. No. 5,545,414 provides a solid matrix containing protein, fat, and carbohydrate, which has dietary fiber (e.g., guar) encapsulated in zein dispersed therein.

The prior art encapsulated fiber products, although possibly increasing the palatability of the fiber in some applications, do not slow the transfer of water to the extent desired during food processing or digestion. The encapsulated fibers of the present invention have significantly decreased water absorption characteristics. Thus, in addition to increased palatability, the encapsulated fibers of this invention provide improved digestion and result in increased satiety during digestion.

SUMMARY OF THE INVENTION

The present invention generally relates to low calorie bulking agents coated with a lipid compound to form a base or inner layer and thereafter encapsulating the fiber/lipid complex within a protein compound as an outer layer. In effect, the present invention provides a delivery system for edible fibers wherein the moisture absorption by the edible fibers can be controlled. Using the encapsulated fiber of this invention, the absorption of water by the edible fiber (and thus the swelling of the edible fiber) can be effectively delayed until the encapsulated fiber reaches the stomach and normal digestive processes begin.

The present invention also relates to an encapsulated edible fiber product having controlled water absorption, said encapsulated edible fiber product comprising edible fiber particles, wherein the surface of the edible fiber particles is substantially covered with an inner layer comprising a fat or lipid and the inner layer is essentially completely covered with an outer layer comprising protein; wherein the inner and outer layers provide an effective moisture barrier for the edible fiber to prevent significant swelling of the edible fiber particles due to moisture absorption during storage and initial stages of digestion by a human, and wherein the moisture barrier is breached during later stages of digestion so that the edible fiber particles swell due to moisture absorption. For purposes of this invention, the "initial stages" of digestion are intended to include mastication, swallowing, and entry into the stomach of either the encapsulated edible fiber particles or a food product containing the encapsulated edible fiber particles. Also for purposes of this invention, "later stages" of digestion are is intended to mean to include actual digestive processes within the stomach and entry into the small intestines; generally, however, swelling of the edible fiber particles will be substantially complete before entry into the small intestines.

The lipid coating or base layer on the fiber particle serves to anchor the later-applied protein coating, allowing the protein layer to fully encapsulate the fiber particle. Examples of suitable "low calorie bulking agents" or fiber compounds for use in the present invention are various types of celluloses, raw starches, modified starches, glucans, brans, hydrocolloids, xanthans, algins, alginate salts, pectins, guars, chitosan, and the like as well as mixtures thereof. The addition of a lipid or base layer at least partially surrounding the fiber facilitates subsequent coating with a protein layer, which is normally extremely difficult due to the zeta-potential of the fiber. Encapsulation by the protein and lipid layers results in a fiber particle that may be added to food products, and will not absorb significant water during processing or the initial stages of consumption. This results in enhanced baking properties and digestibility of fiber sources. The proteinaceous envelope also leads to an increased sense of satiety from consumption of foods containing the encapsulated fiber ingredient, since the fiber is not released from its proteinaceous envelope until it comes into contact with pepsin and lipase in the stomach, allowing it to rapidly absorb water and expand, filling the stomach.

DETAILED DESCRIPTION

Figure 1:
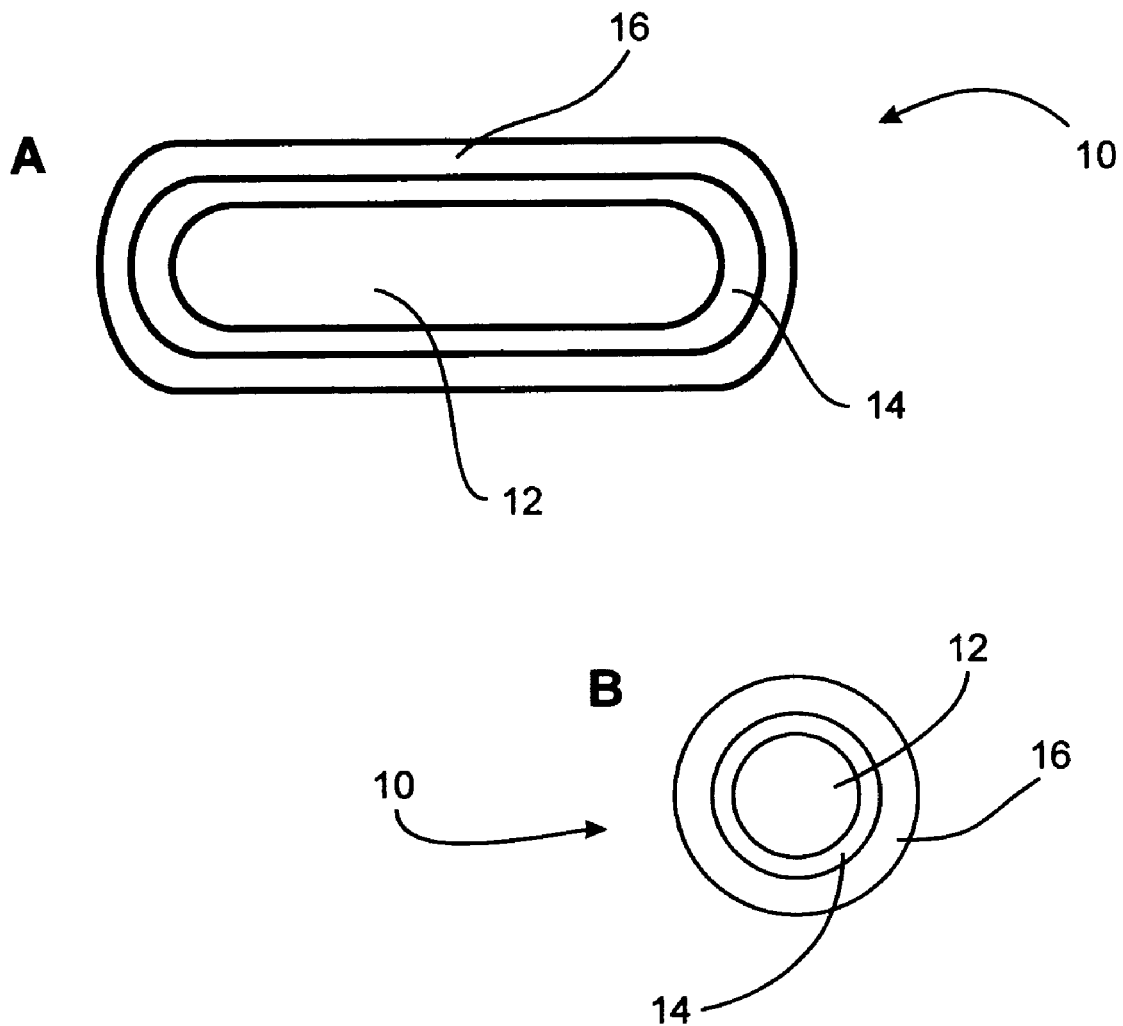
FIG. 1 illustrates an encapsulated fiber of the present invention.

The present invention generally relates to low calorie bulking agents coated with a fat or lipid compound to form a base layer and thereafter encapsulating the fiber and base layer product with a protein compound to form an outer layer. A representative encapsulated fiber 10 is shown in FIG. 1 with fiber 12 surrounded by an fat or lipid base layer 14 which is in turn surrounded by a protein outer layer 16; panels A and B provides a view along the length of the oblong fiber 12 and a cross sectional view, respectively.

Suitable dietary fibers for use with the present invention include celluloses, raw starches, modified starches, glucans, brans, hydrocolloids, xanthans, algins, alginate salts, pectins, guars, chitosan, and the like as well as mixtures thereof. Especially preferred dietary fibers include bran fibers (especially cereal brans), celluloses, and alginate salts such as potassium alginate. The fiber 12 shown in FIG. 1 is oblong; of course, other fiber shapes (e.g., spherical, ellipsoid, and the like) can be used. Generally, the longest dimension of the fiber (e.g., the length of the fiber 12 in FIG. 1A) is about 75 to about 100 microns, and preferably about 25 to about 50 microns and the shortest dimension (e.g., the diameter of the fiber 12 in FIG. 1B) is about 5 to about 10 microns, and preferably about 25 to about 50 microns.

The first or inner layer of the encapsulated material to be applied to the fiber of the present invention comprises a fat or lipid layer which acts as a base layer for subsequent adherence of the second or outer protein layer. Suitable fats or lipids used to form this base layer are edible fats or lipids having a melting point of about 10 to about 39° C., and preferably about 30 to about 37° C. Examples include butter fat, salatrim, tropical oils, partially hydrogenated vegetables oils, and the like as well as mixtures thereof. Salatrim is a mixture of short- and long-chain acyl triglycerides prepared by interesterification of triacetin, tripropionin, or tributyrin, or their mixtures with either hydrogenated canola, soybean, cottonseed, or sunflower oil and which typically contain 30-67 mol-% short-chain fatty acids (SCFA) and 33-70 mol-% long-chain fatty acids (LCFA). Olestra is a mixture of hexa-, hepta- and, predominantly, octa-esters of sucrose which are not hydrolyzed in the intestine and are not absorbed. They are formed by reaction between sucrose and fatty acid esters obtained from edible fats and oils (e.g., soybean, maize, coconut, and cottonseed) of carbon chain length C8-C22. Especially preferred fats include low- or reduced-calorie triglycerides or blends thereof having either one short chain (about 2 to about 4 carbon atoms) fatty acid and two long chain (about 16 to about 22 carbon atoms) saturated fatty acids or two short chain (about 2 to about 4 carbon atoms) fatty acids and one long chain (about 16 to about 22 carbon atoms) saturated fatty acid; such triglycerides should be at least partially digested by gastric secretions (e.g., lipase) in the stomach. Such preferred reduced calorie triglycerides can be obtained, for example, from Danisco A/S (Copenhagen, Denmark) under the tradename Benefat®.

Although it not necessary that the inner layer of fat or lipid completely cover or encapsulate the fiber particle, it should provide substantial coverage of the surface of the fiber. For purposes of this invention, "substantial coverage" or "substantially complete coverage" of the surface of the fiber or "substantially covered" by the inner layer is intended to mean at least about 80 percent coverage, more preferably at least about 90 percent coverage, and most preferably at least about 95 percent coverage of the surface of the fiber. As noted above, this inner layer provides a base layer to which the outer layer of protein can adhere. Thus, in effect, the inner layer acts as adhesive for the outer protein layer.

The outer layer of the encapsulated fiber of the present invention comprises a protein layer which acts, in effect, as a protective or moisture barrier layer and which adheres to the inner fat or lipid layer. Suitable proteins for use with the present invention include casein, zein, soy isolate, milk protein concentrate, whey protein concentrate, and the like as well as mixtures thereof. The proteins should be highly dispersible and/or soluble in water or ethanol but form films upon removal of the solvent. Zein is a preferred coating protein that is highly water-resistant after the alcohol is removed. Casein, soy isolate, milk protein concentrate, and whey protein concentrate also form films upon removal of the solvent; the stability of the films can be increased by heating the coated material to about 70 to about 100° C. to induce crosslinking within the film. The outer or protein layer should provide essentially complete coverage or encapsulation of the lipid-coated fiber particle. For purposes of this invention, "essentially complete coverage or encapsulation" is intended to mean that at least about 90 percent, more preferably at least about 95 percent, and most preferably at least about 97 percent of the surface of the lipid-coated fiber is coated or encapsulated by the protein.

The relative amounts of fiber, first or inner layer (i.e., fat or lipid), and second or outer layer (i.e., protein) can vary significantly. Generally, the encapsulated fibers comprise about 45 to about 75 percent fiber, about 10 to about 35 percent of first layer material, and about 10 to about 40 percent of the second layer material. Preferably, the encapsulated fibers comprise about 50 to about 60 percent fiber, about 10 to about 15 percent of the fat or lipid layer material, and about 25 to about 40 percent of the protein layer material.

The encapsulated fibers of the present invention are generally resistant to significant water absorption until the food containing the encapsulated fibers enters the stomach and the digestive process begins. As the digestive process proceed, gastric proteins (e.g., pepsin) in the stomach first initiate digestion of the outer layer of protein. As digestion of the outer layer proceeds, "holes" in the encapsulated material allows gastric lipases to attack the lipid within the inner layer. Hydration of the fiber itself may then follow. The swelling of the fiber due to hydration increase its bulk in the gastrointestinal tract, thereby causing a feeling of "fullness." Thus, the encapsulated fibers of the present invention may also increase the feeling of satiety and, therefore, decrease the overall amount of food consumed. Both proteins and lipids are rapidly hydrolyzed in the stomach, but remain substantially unaffected during the earlier portions of digestion. Fiber that has been treated according to the present invention generally does not hydrate within about 30 minutes when suspended in water at room temperature. However, the same fibers will become hydrated under the same conditions within about 30 minutes upon the addition of a combination of gastric lipase and pepsin similar to that found in a typical stomach during digestion. Although not wishing to be limited by theory, it appears that when the encapsulated fibers of the present invention enter the stomach the pepsin present first removes the outer protein layer. At this point, any water contacting the fibers (either through "holes" or voids in the inner layer or as the inner layer dissolves) will cause the fibers to begin swelling. During this time, lipase in the stomach will assist in removing or dissolving the inner layer and allow water to contact the fiber and complete the swelling process. Thus, it appears that fiber contained in the encapsulated fibers of this invention generally will not become hydrated until pepsin and lipase in the stomach hydrolyze both the protein and lipid layers, at which time the fibers will expand significantly and, for many individuals, provide increased satiety and reduction in the amount of additional food consumed. Again not wishing to be limited by theory, it also appears that, in addition to the satiety effect from the expanding fibers, combining protein and dietary fiber (which the present invention provides in a single source) may also have an impact on late satiety. See, Burley et al., "Influence of a High-fiber Food (Myco-protein) on Appetite: Effects on Satiation (Within Meals) and Satiety (Following Meals)," *Eur. J. Clin. Nutr.*, 47(6):409-418, (1993).

Again not wishing to be limited by theory, it also appears that lipid contained in the encapsulated fiber product may also increase satiety by stimulating the release of cholecystokinin (CCK). Once CCK release has been stimulated, the fiber appears to prolong CCK elevation during the period during which an individual is eating. It has been suggested that increasing either the fiber or fat content of a meal leads to higher degrees of satiation in women. See, Burton-Freeman et al., "Plasma Cholecystokinin is Associated With Subjective Measures of Satiety in Women," *Am. J. Clin. Nutr.*, 76(3):659-667 (2002). The encapsulated fiber of the present invention provides such lipids and fiber in a single source.

Encapsulated fibers prepared according to the present invention may be included in dough or baked product, including without limitation, cookies, cereals, crackers, pasta, pizza dough, snacks, confections, desert bars, nutritional bars, nutritional supplements, and similar products. Typically, the level of encapsulated fibers added to various food products will be in the range of up to about 60 percent, and preferably in the range of about 10 to about 40 percent. Of course, such preferred ranges may vary depending on the purpose of the product. Thus, for example, a nutritional bar or nutritional supplement may preferably contain higher levels than other types of products. Levels higher and lower than these ranges may be used if desired.

Figure 2:
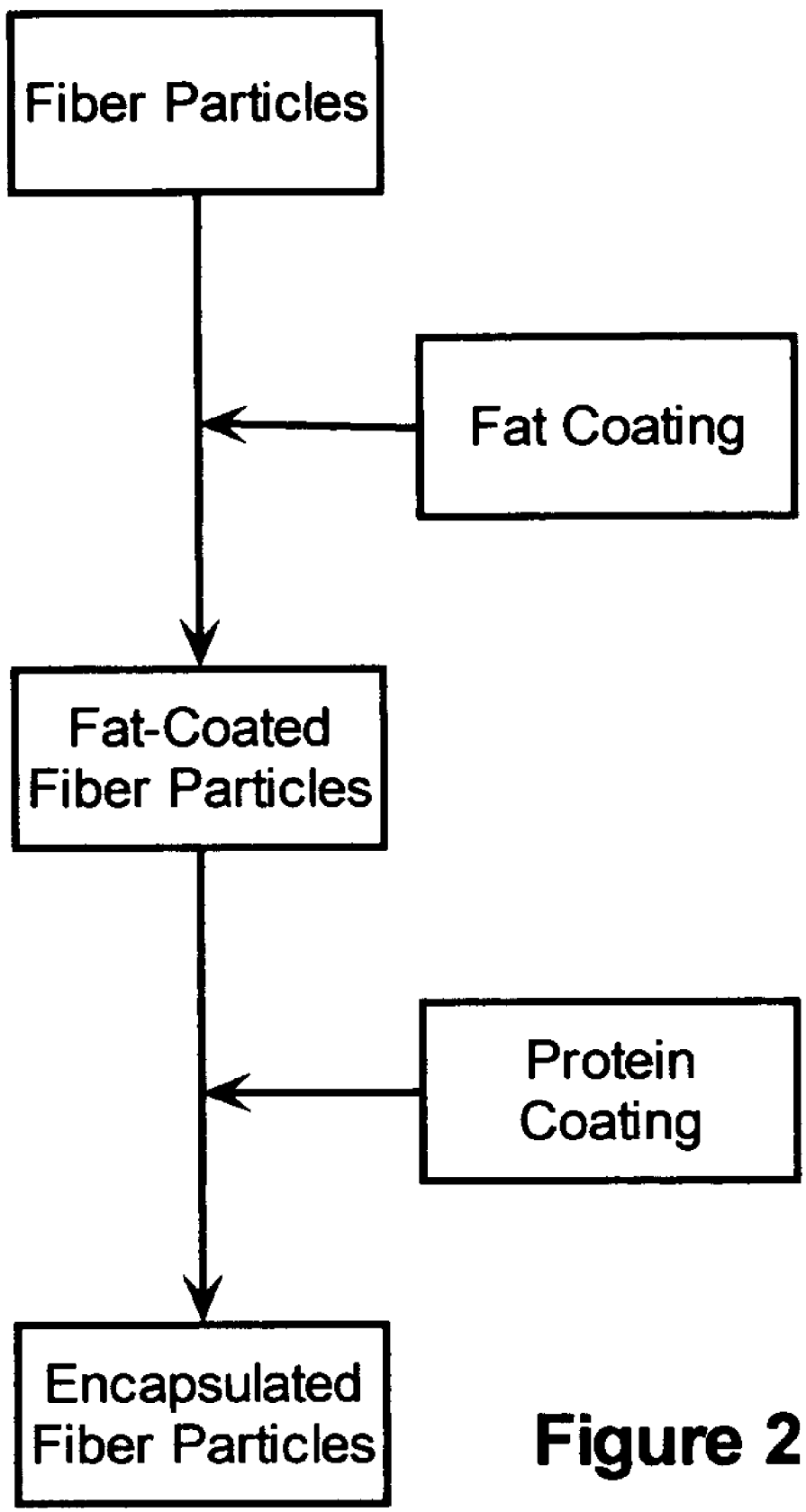
FIG. 2 is a flow diagram illustrating a method of preparing the encapsulated fiber of the present invention.

FIG. 2 generally illustrates the method of this invention. This method generally comprises (1) providing edible fiber particles having an outer surface, (2) applying an inner layer comprising an edible fat or lipid on the outer surface of the edible fiber particles such that coverage of the outer surface of edible fiber particles by the inner surface is substantially complete, and (3) applying an outer layer comprising a edible protein on the inner layer with such that coverage of the inner layer by the outer layer is essentially complete; wherein the inner and outer layers provide an effective moisture barrier to prevent significant swelling of the edible fiber particles due to moisture absorption during storage and initial stages of digestion by a human, and wherein the moisture barrier is breached during later stages of digestion so that the edible fiber particles swell due to moisture absorption. Preferably the techniques used for application of both the inner and outer layers should avoid significant agglomeration of the edible fiber particles.

The fibers can be coated using conventional coating techniques. For example, the "panning" approach as used in the confection industry can be used wherein the fibers are mildly heated in a rotating confection pan. The lipid material (e.g., Benefat®) is melted or dissolved in a solvent (e.g., alcohol). The lipid material is then sprayed on the fiber. If a solvent is used, the fat coats the fiber as the solvent evaporates. If no solvent is used, the lipid material is generally applied at about 20° C. above the melting point of the fat. After the lipid layer is applied, the resulting fibers are generally cooled to room temperature with constant mixing. The protein layer is then applied by spraying using a protein solution. For example, a 20 percent zein solubition in ethanol solution can be used to apply the protein layer. The solvent is then allowed to evaporate, thereby providing the encapsulated fibers. Generally, the temperature is increased (e.g., to about 50° C.) to assist in removing the solvent.

The following examples are intended to illustrate the invention and not to limit it. Numerous modifications may be made by those skilled in the art without departing from the true spirit and scope of the invention. Unless noted otherwise, all percentages and ratios are by weight. All references cited herein are hereby incorporated by reference in their entireties; such references, include, but are not limited to, patents, patent publications, other publications, and the like.

Example 1

Finely ground wheat bran (irregular particles of about 1 to 50 microns) was suspended in a Glatt Air Technologies Agglomerator (Glatt Air Technologies, Germany). Benefat® B (Danisco A/S (Copenhagen, Denmark); a blend of triacylglycerols having short and long chain saturated fatty acids having a melting point of about 30° C.) was dissolved in ethanol (about 35 percent Benefat® B). The resulting solution was sprayed onto the suspended bran in the agglomerator at about 45° C. to provide a fat-coated layer. The estimated coverage by the fat layer was greater than about 90 percent. A 10 percent sodium caseinate aqueous solution was sprayed on the fat-coated fiber the mixture at a temperature of about 40° C. to provide a protein outer coating. The resulting product was then dried at about 40° C. for about 30 minutes to provide the encapsulated fiber.

The encapsulated fiber was used to prepare sugar cookies. A cookie dough was prepared containing about 225 g flour, about 130 g sugar, about 31 g shortening, about 40 g encapsulated fiber, about 2.1 g salt, about 2.5 g sodium bicarbonate, about 33 g dextrose, and about 16 g water by mixing in a blender for about 2 minutes. The cookie dough was rolled and cut into 2.5 cm circles with a cookie cutter, placed on a cookie sheet and then baked at about 375° F. for about 11 minutes. Control samples were also prepared using a similar dough but without the encapsulated fiber. Cookies incorporating the encapsulated fiber had texture and flavor (i.e., moist, soft with a pleasant mouth-feel and flavor) similar to control cookies. Adding the fibers, without encapsulation by the process of this invention, is expected to provide cookies which are hard, gritty, and have a dry mouth-feel. When exposed to digestive enzymes (lipase & pepsin), the encapsulated fibers of this invention expand and hold water.

Example 2

The encapsulated fiber of Example 1 was also used to prepare pasta. About 200 g of the encapsulated fiber and about 800 g pasta flour were blending together in a blender for about 3 minutes. About 200 g water was slowly sprayed on the mixture with continuous mixing to form a pasta dough. The resulting dough was then extruded (either flat sheets or as spaghetti) using a hand pasta machine. The extruded pasta was dried overnight at room temperature. The dried pasta was then cooked in boiling water for about 5 minutes. The cooked pasta containing the encapsulated fiber has a texture and flavor similar to a control pasta without added fiber.

The invention claimed is:

1. An encapsulated edible fiber product having controlled water absorption, said encapsulated edible fiber product comprising:
    edible fiber particles having an outer surface and a longest dimension of about 25 to about 100 microns;
    at least about 80 percent of the outer surface of the edible fiber particles substantially covered with an inner layer comprising an edible fat or lipid;
    at least about 90 percent of the inner layer essentially covered with an outer layer comprising a hydrophilic edible protein selected from soy isolate, milk protein concentrate, and whey protein concentrate;
    wherein the inner and outer layers provide an effective moisture barrier to prevent significant swelling of the edible fiber particles due to moisture absorption during processing, storage, and initial stages of digestion by a human, and wherein the moisture barrier is configured to be breached during later stages of digestion by gastric proteins in the stomach to hydrolyze both the inner fat or lipid layer and the outer hydrophilic edible protein layer so that the edible fiber particles swell in the stomach due to moisture absorption; and
    wherein the edible fiber particles are brans selected from the group consisting of cereal brans.

2. The encapsulated edible fiber product of claim 1, wherein the encapsulated edible fiber product comprises about 45 to about 75 percent of the edible fiber particles, about 10 to about 35 percent of the edible fat or lipid, and about 10 to about 40 percent of the edible protein.

3. The encapsulated edible fiber product of claim 1, wherein the edible fat or lipid has a melting point of about 30 to about 40° C.

4. The encapsulated edible fiber product of claim 1, wherein the edible fat or lipid is a low- or reduced-calorie triglyceride or blend thereof having one or two short chain fatty acids and one or two long chain saturated fatty acids.

5. A method for preparing an encapsulated edible fiber product having controlled water absorption, said method comprising:
    (1) providing edible fiber particles having an outer surface,
    (2) applying an inner layer comprising an edible fat or lipid on the outer surface of the edible fiber particles such that coverage of the outer surface of edible fiber particles by the inner surface is substantially complete so that at least about 80 percent of the outer surface of the fiber particles is covered with the edible fat or lipid, and
    (3) applying an outer layer comprising a hydrophilic edible protein selected from soy isolate, milk protein concentrate, and whey protein concentrate on the inner layer such that there is greater coverage of the inner layer by the outer layer than the inner layer covering the outer surface; and wherein the inner and outer layers provide an effective moisture barrier to prevent significant swelling of the edible fiber particles due to moisture absorption during processing, storage, and initial stages of digestion by a human, and wherein the moisture barrier is configured to be breached during later stages of digestion by gastric protein in the stomach to hydrolyze both the inner fat or lipid layer and the outer hydrophilic protein layer so that the edible fiber particles swell in the stomach due to moisture absorption.

6. The method of claim 5, wherein the edible dietary fiber particles are selected from the group consisting of celluloses, raw starches, modified starches, glucans, brans, hydrocolloids, xanthans, algins, alginate salts, pectins, guars, chitosan, and mixtures thereof; wherein the edible fat or lipid has a melting point of about 30 to about 40° C.; and wherein the encapsulated edible fiber product comprises about 45 to about 75 percent of the edible fiber particles, about 10 to about 35 percent of the edible fat or lipid, and about 10 to about 40 percent of the edible protein.

7. The method of claim 6, wherein the edible fat or lipid is a low- or reduced-calorie triglyceride or blends thereof having one or two short chain fatty acids and one or two long chain saturated fatty acids.

8. The method of claim 5, wherein the application of the inner layer is spraying the edible fat or lipid onto the outer surface of the edible fiber particles and wherein the application of the outer layer is spraying the edible protein onto the inner layer.

9. The method of claim 6, wherein the application of the inner layer is spraying the edible fat or lipid onto the outer surface of the edible fiber particles and wherein the application of the outer layer is spraying the edible protein onto the inner layer.

10. An encapsulated edible fiber product having controlled water absorption, said encapsulated edible fiber product comprising:

a core of about 45 to about 75 percent edible fiber particles having an outer surface thereof;

a base layer of about 10 to about 35 percent of an edible fat or lipid substantially covering the outer surface of the edible fiber core;

a protein layer of about 10 to about 40 percent of a water soluble edible protein selected from soy isolate, milk protein concentrate, whey protein concentrate, and mixtures thereof essentially covering the base layer of the edible fat or lipid;

a coverage of the protein layer about the base layer being greater than a coverage of the base layer about the outer surface of the edible fiber core, the coverage of the base layer effective to anchor the water soluble edible protein to the edible fiber core so that at least about 90 percent of the base layer is covered by the protein layer; and wherein the base and protein layers provide an effective moisture barrier to prevent significant swelling of the edible fiber particles due to moisture absorption during processing, storage, and initial stages of digestion by a human, and wherein the moisture barrier is configured to be breached during later stages of digestion by gastric protein in the stomach to hydrolyze both the inner fat or lipid layer and the outer hydrophilic protein layer so that the edible fiber particles swell in the stomach due to moisture absorption.

11. An encapsulated edible fiber product having controlled water absorption, said encapsulated edible fiber product comprising:

edible fiber particles having an outer surface;

at least about 80 percent of the outer surface of the edible fiber particles substantially covered with an inner layer comprising an edible fat or lipid;

at least about 90 percent of the inner layer essentially covered with an outer layer comprising a hydrophilic edible protein selected from milk protein concentrate and whey protein concentrate;

wherein the inner and outer layers provide an effective moisture barrier to prevent significant swelling of the edible fiber particles due to moisture absorption during processing, storage, and initial stages of digestion by a human, and wherein the moisture barrier is configured to be breached during later stages of digestion by gastric protein in the stomach to hydrolyze both the inner fat or lipid layer and the outer hydrophilic protein layer so that the edible fiber particles swell in the stomach due to moisture absorption; and wherein the edible fiber particles are brans selected from the group consisting of cereal brans.

* * * * *